(12) United States Patent
Ramsager (10) Patent No.: US 12,360,528 B2
(45) Date of Patent: Jul. 15, 2025

(54) BI-DIRECTIONAL AUTONOMOUS LOGISTICS VEHICLES

(71) Applicant: United Parcel Service of America, Inc., Atlanta, GA (US)

(72) Inventor: Thomas Ramsager, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 456 days.

(21) Appl. No.: 16/997,430

(22) Filed: Aug. 19, 2020

(65) Prior Publication Data
US 2022/0057797 A1     Feb. 24, 2022

(51) Int. Cl.
| | |
|---|---|
| *G05D 1/00* | (2024.01) |
| *G06K 7/10* | (2006.01) |
| *G06K 7/14* | (2006.01) |
| *G06Q 10/08* | (2023.01) |
| *G06Q 50/40* | (2024.01) |

(52) U.S. Cl.
CPC ........... *G05D 1/0088* (2013.01); *G05D 1/028* (2013.01); *G05D 1/0293* (2013.01); *G06K 7/10366* (2013.01); *G06K 7/1413* (2013.01); *G06K 7/1417* (2013.01); *G06Q 10/08* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 9,827,683 B1 | 11/2017 | Hance et al. | |
| 10,245,993 B1 | 4/2019 | Brady et al. | |
| 11,091,211 B1* | 8/2021 | Ebrahimi Afrouzi | .. B62D 63/02 |
| 11,951,893 B2* | 4/2024 | Galin | ...... B60P 3/007 |
| 2005/0131645 A1* | 6/2005 | Panopoulos | ......... G05D 1/0244 |
| | | | 701/472 |

(Continued)

FOREIGN PATENT DOCUMENTS

| | | | | |
|---|---|---|---|---|
| CA | 3075616 C | * | 8/2023 | ............ A61J 7/0069 |
| WO | 2020/146701 A1 | | 7/2020 | |

OTHER PUBLICATIONS

U.S. Appl. No. 62/984,226 (the domestic benefit from US 2021/0269255) (Year: 2020).*

(Continued)

*Primary Examiner* — Jason Holloway
(74) *Attorney, Agent, or Firm* — Shook, Hardy & Bacon L.L.P.

(57) ABSTRACT

Systems, methods, and apparatuses for transporting a plurality of modular containers using one or more autonomous vehicles. The system may include a housing, motorized wheels, a proximity sensor, and a control system. The housing may have a body with a floor, a first end and a second end opposite the first end, and the motorized wheels may be rotatably attached to the housing. The proximity sensor may identify proximity of the housing to other objects. The control system may be communicably coupled to the proximity sensor and the plurality of motorized wheels and may instruct rotatable actuation and steering of at least one of the motorized wheels based on user input, input from the proximity sensor and/or input read from a memory storage device.

12 Claims, 9 Drawing Sheets

(56) References Cited

U.S. PATENT DOCUMENTS

| | | | |
|---|---|---|---|
| 2007/0140817 A1* | 6/2007 | Hansl | B66F 9/07 |
| | | | 414/277 |
| 2009/0252577 A1* | 10/2009 | Tuffs | B66F 9/063 |
| | | | 414/222.01 |
| 2015/0353212 A1* | 12/2015 | Williamson | B65B 43/52 |
| | | | 53/502 |
| 2017/0357270 A1 | 12/2017 | Russell | |
| 2018/0330325 A1* | 11/2018 | Sibley | B60P 3/007 |
| 2019/0135600 A1* | 5/2019 | Waller | F16M 11/42 |
| 2019/0283648 A1* | 9/2019 | Skaaksrud | B25J 9/163 |
| 2020/0130510 A1* | 4/2020 | Eck | B60L 53/14 |
| 2020/0277137 A1* | 9/2020 | Bastian, II | B66F 9/065 |
| 2021/0269255 A1* | 9/2021 | Montgomery, III | |
| | | | G06Q 10/08355 |
| 2022/0185585 A1* | 6/2022 | Toebes | B25J 5/007 |
| 2024/0067510 A1* | 2/2024 | Ulbrich | G05D 1/0253 |

OTHER PUBLICATIONS

International Search Report and Written Opinion received for PCT Patent Application No. PCT/US2021/042167, mailed on Oct. 7, 2021, 13 pages.
Templeton, Brad, "The Match & Mismatch of Amazon Buying Self-Driving Unicorn Zoox, as is Rumored", forbes.com, Available online at: <https://www.forbes.com/sites/bradtempleton/2020/05/27/the-match-mismatch-of-amazon-buying-self-driving-unicorn-zoox-as-is-rumored/?sh=1ffe541e394d>, May 27, 2020, 5 pages.
Office Action received for European Application No. 21759194.0, mailed on Apr. 5, 2024, 8 pages.

\* cited by examiner

BI-DIRECTIONAL AUTONOMOUS LOGISTICS VEHICLES

TECHNICAL FIELD

The field relates to autonomous transport and manipulation of items or containers.

BACKGROUND

Transporting containers or other items in an industrial facility or between facilities in an industrial yard or complex presents unique challenges. Traditionally, such containers or items are transported manually. For example, numerous vehicles and workers are typically required to drive and navigate such vehicles transporting containers or other items from one location to another within the industrial facility or between facilities in an industrial yard or complex. Additionally, workers are also generally required for manually loading and unloading of these vehicles. This need for manual handling can limit the ability to process an ever increasing number of containers or other items being transported within a facility and among facilities within an industrial yard or complex. Therefore, improvements in transportation and manipulation of such containers or other items are needed.

SUMMARY

This summary is intended to introduce a selection of concepts in a simplified form that are further described below in the detailed description section of this disclosure. This summary is not intended to identify key or essential features of the claimed subject matter, and it is also not intended to be used as an aid in isolation to determine the scope of the claimed subject matter.

In brief, and at a high level, this disclosure describes, among other things, systems, methods, and apparatuses for transporting and manipulating containers and/or items therein in an automated or semi-automated fashion. The systems described herein may utilize, in various embodiments, a plurality of autonomous vehicles. Each of the autonomous vehicles may include a hollow housing, a plurality of independently steerable motorized wheels, a lifter, at least one indicator light, a plurality of modular containers, one or more container-moving mechanisms, a proximity sensor, a location sensor, and/or a control system. The hollow housing may have a body that includes a floor, a first end and a second end opposite the first end. The plurality of independently steerable motorized wheels may be rotatably attached to the hollow housing. Likewise, the lifter may be attached to the hollow housing and may be actuatable to modify an elevation of the floor (e.g., raising or lowering the floor to a loading dock).

The at least one indicator light may be disposed on an exterior of the hollow housing and may be configured for indicating a travel direction of the autonomous vehicle. Furthermore, the plurality of modular containers may be sized to fit within the hollow housing, and the one or more container-moving mechanisms may be configured for actuating the modular containers into, within, and/or out of the hollow housing. The proximity sensor may be configured for identifying proximity of the hollow housing to other objects, while the location sensor may determine a geographic location of the autonomous vehicle.

The control system may be communicably coupled to the proximity sensor, the location sensor, the lifter, and/or the plurality of independently steerable motorized wheels. Furthermore, the control system may be configured to instruct actuation of the lifter and the independently steerable motorized wheels based on user input, input from the proximity sensor, input from the location sensor, and/or input read from a memory storage device. In some embodiments, the control system is wirelessly communicably coupled to a control system of at least one other of the plurality of autonomous vehicles for coordinated travel and transport.

BRIEF DESCRIPTION OF THE DRAWINGS

The embodiments of this disclosure related to autonomous vehicles and are described with reference to the attached drawing figures, which illustrate non-limiting examples of the disclosed subject matter, in which like numerals represent like elements, wherein.

DETAILED DESCRIPTION

The subject matter of this disclosure is described herein to meet statutory requirements. However, the description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various elements except when the order is explicitly described and required.

In general, and at a high level, this disclosure describes, among other things, embodiments that enable and support the automated or semi-automated transport and handling of a plurality of modular containers with one or more autonomous vehicles. Traditionally, numerous vehicles and workers are required to drive vehicles delivering containers or other items from one location to another within an industrial facility or between facilities or loading docks in an industrial yard or complex. Then the same or additional workers are generally required to manually load and unload items to and from these vehicles.

To solve the limitations of these labor-intensive prior art methods, the autonomous vehicles described herein may be configured to operate without a human operator for navigation to and from multiple loading docks or other various loading/unloading locations within a large facility, industrial yard, or the like. This may be accomplished with control systems and sensors, which may also allow for the autonomous vehicles to modify an elevation of the modular containers, such as by autonomous control of a floor or housing of the autonomous vehicles via a lifter or the like. Furthermore, the control systems of the autonomous vehicles may wirelessly communicate with each other for coordinated travel (e.g., traveling in close proximity to each other without collision and plotting travel routes with each other for maximum efficiency).

In some embodiments, the control systems of the autonomous vehicles described herein may receive identification data and order data about each of the modular containers loaded therein. This data may be utilized by the control systems to communicate with each other regarding the modular containers contained thereon and even, in some embodiments, allow transferring of modular containers between autonomous vehicles. Thus, the autonomous vehicles and their control systems, as described herein, advantageously reduce the need for manual handling and human drivers, reducing costs and improving efficiency and accuracy of transporting an ever increasing number of packages or other items within a facility and among facilities within an industrial yard or complex. Examples of such embodiments are described in detail below with reference to attached FIGS. 1-9.

The term "autonomous vehicles" as used herein should be interpreted broadly to include any vehicle that is able to plan its navigational path and to execute its plan without human intervention. For example, the autonomous vehicles may be ground-based vehicles powered by propulsion units (e.g., motors or the like) and various embodiments of control systems described herein. The term "modular container" as used herein should be interpreted broadly, to include a package, enclosure, or parcel, as well any contents contained therein, that are handled and transported from one location to another location, e.g., in an industrial yard or warehouse yard. In this sense, a modular container may be considered an object that is being handled, shifted, transported, or otherwise manipulated by the autonomous vehicles described herein.

Some of the subject matter disclosed herein may be provided as, at least in part, a method, a system, and/or a computer-program product, among other things. Accordingly, certain aspects disclosed herein may take the form of hardware, or may be a combination of software and hardware. A computer-program that includes computer-useable instructions embodied on one or more computer-readable media may also be used. The subject matter hereof may further be implemented as hard-coded into the mechanical design of computing components and/or may be built into a system or apparatus that enables automated or semi-automated operation and transport of the autonomous vehicles and the modular containers thereof as described herein.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Figure 1:
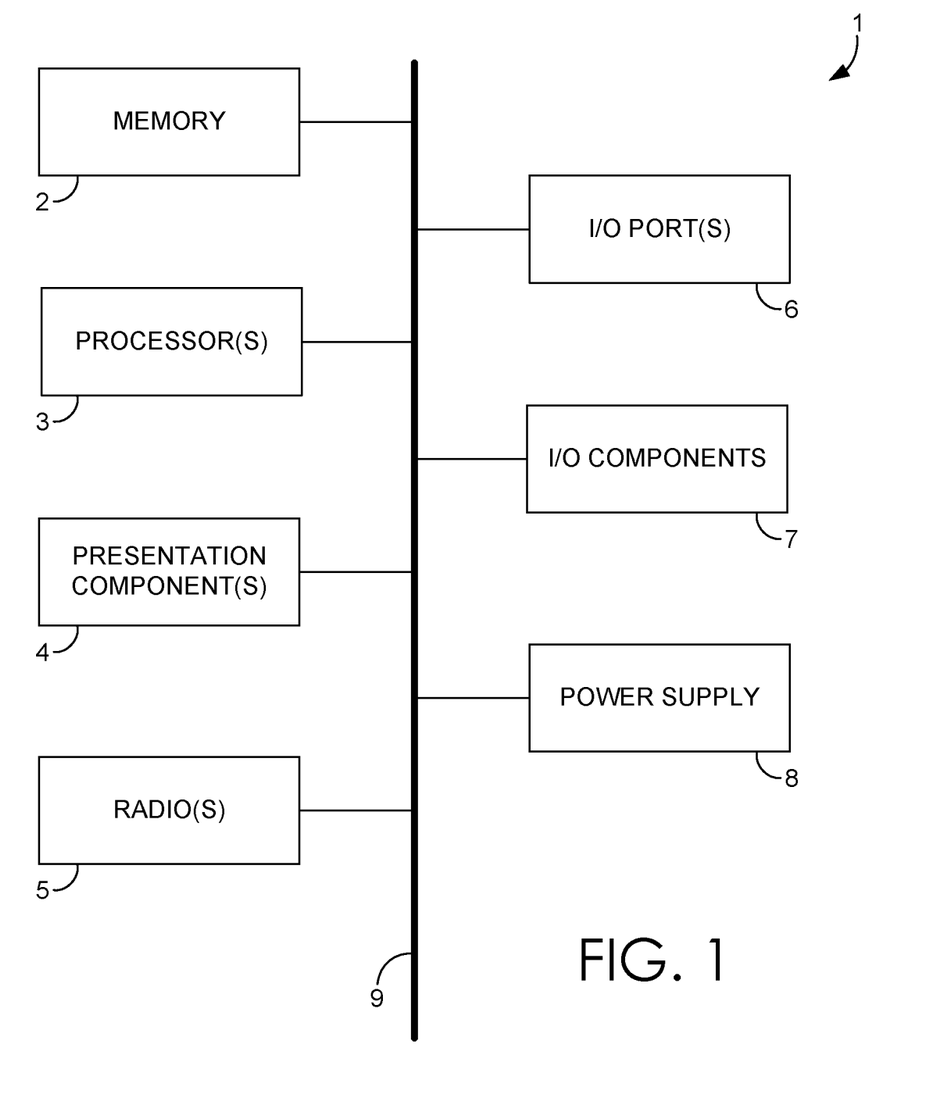
FIG. 1 depicts a block diagram of an example computing device in accordance with an embodiment thereof.

Referring now to FIG. 1, a block diagram of an example computing device 1 suitable for supporting the operation of embodiments described herein is provided, in accordance with an embodiment hereof. It should be noted that although some components depicted in FIG. 1 are shown in the singular, they may be plural, and the components may be connected in a different, including distributed, configuration. For example, computing device 1 might include multiple processors and/or multiple radios. As shown in FIG. 1, computing device 1 includes a bus 9 that may directly or indirectly connect different components together, including memory 2, processor(s) 3, presentation component(s) 4 (if applicable), radio(s) 5, input/output (I/O) port(s) 6, input/output (I/O) component(s) 7, and power supply 8.

Memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard). However, the presentation component 4 may be omitted without departing from the scope of the technology described herein.

The radio 5 may facilitate communication with a network, and may additionally or alternatively facilitate other types of wireless communications, such as Wi-Fi, WiMAX, LTE, Bluetooth, and/or VoIP communications, among other communication protocols. In various aspects, the radio 5 may be configured to support multiple technologies, and/or multiple radios may be configured and utilized to support multiple technologies.

The input/output (I/O) ports 6 may take a variety of forms. Exemplary I/O ports may include a USB jack, a stereo jack, an infrared port, a firewire port, and/or other proprietary communications ports. The input/output (I/O) components 7 may comprise one or more keyboards, microphones, speakers, touchscreens, and/or any other item useable to directly or indirectly input data into the computing device 1. The power supply 8 may comprise batteries, generators, fuel cells, and/or any other component that may act as a power source to supply power to computing device 1 and to any other components described herein.

As depicted in FIGS. 2-9, any of a plurality of autonomous vehicles 10 constructed in accordance with embodiments herein may include various combinations of the following: a housing 12, a plurality of wheels 14, a lifter 16, at least one indicator light 18, a plurality of modular containers 20, one or more container-moving mechanisms 22, one or more sensors 24,26, a scanner 28, and a control system 30. In some embodiments, the autonomous vehicles 10 may further comprise various actuators, such as door actuators 32, wheel actuators 34, and container door actuators 36 as described herein. Furthermore, the autonomous vehicles 10 described herein and the operable components and sensors thereof may be powered using any power sources known in the art, such as battery power, generator, and/or combustion engine and the like.

Figure 2:
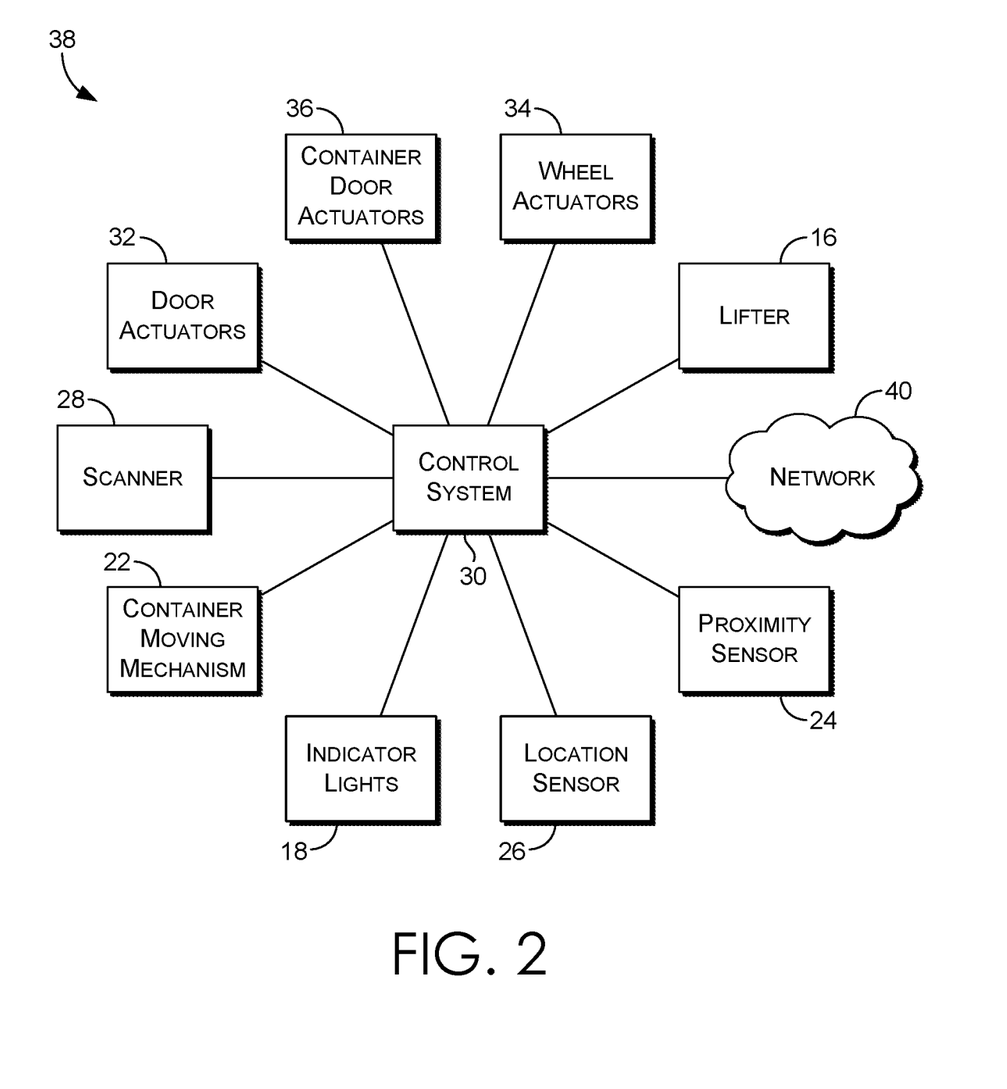
FIG. 2 depicts a network of components that may be interconnected and/or used with an autonomous vehicle or transport system, in accordance with an embodiment hereof.

Referring now to FIG. 2, a system 38 having a selection of components suitable for supporting automated or semi-automated operation and transport of one or more of the autonomous vehicles 10 as described herein is provided, in accordance with an embodiment hereof. The system 38 depicted in FIG. 2 may communicate with a network 40 or include a network 40. The network 40 may communicate wirelessly with one or more control systems, such as control system 30, of one or more autonomous vehicles 10 in order to provide instructions to one or more components of the autonomous vehicles 10, such as: the lifter 16, the least one indicator light 18, the one or more container-moving mechanisms 22, the proximity sensor 24, the location sensor 26, the scanner 28, the control system 30, the door actuators 32, the wheel actuators 34, and/or the container door actuators 36. In some embodiments, the network 40 interconnects, directly or indirectly (e.g., wired or wirelessly), one or more of the following components of the autonomous vehicles 10, bypassing the control system 30: the lifter 16, the least one indicator light 18, the one or more container-moving mechanisms 22, the proximity sensor 24, the location sensor 26, the scanner 28, the control system 30, the door actuators 32, the wheel actuators 34, and/or the container door actuators 36. These elements are presented generically in FIG. 2 for the purposes of clarity, simplicity, and explanation. In addition, each depicted element in FIG. 2 may represent a plurality of such components. For example, multiple wheel actuators 34 may be utilized and connected to the network 40, directly or indirectly.

Figures 3A, 3B, 3C:
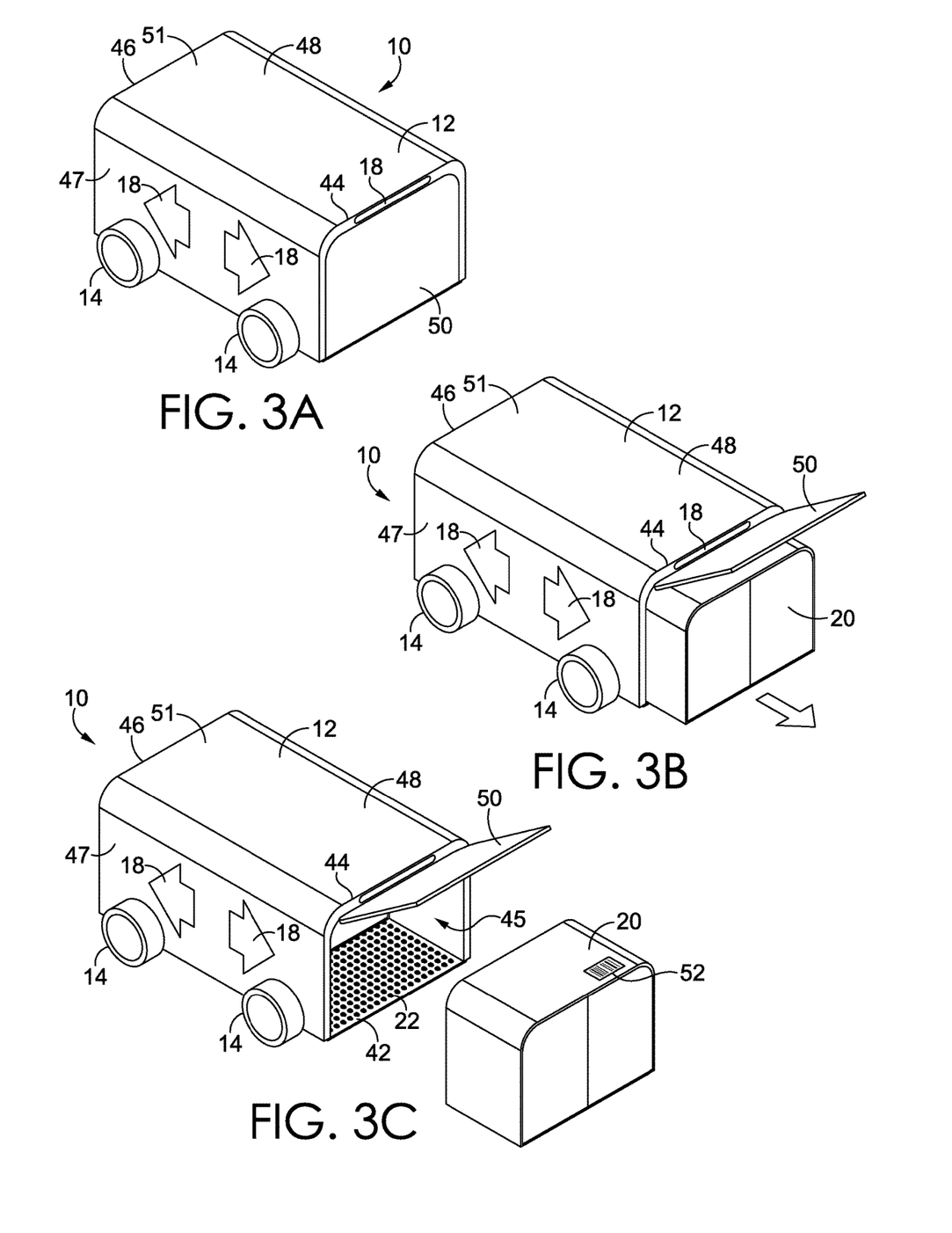
FIG. 3A depicts a perspective view of an autonomous vehicle of a transport system in accordance with an embodiment of hereof.
FIG. 3B depicts a perspective view of the autonomous vehicle of FIG. 3A with a modular container partially removed out of a hollow housing thereof in accordance with an embodiment hereof.
FIG. 3C depicts a perspective view of the autonomous vehicle of FIG. 3A with the modular container fully removed from the hollow housing in accordance with an embodiment thereof.
Figure 4:
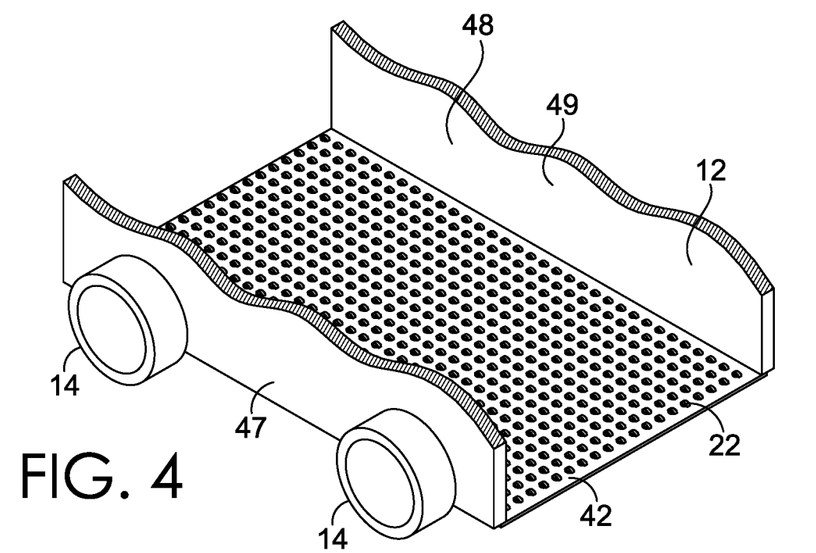
FIG. 4 depicts a perspective view of the interior of the autonomous vehicle of FIG. 3A and a roller deck within the hollow housing thereof in accordance with an embodiment hereof.

Continuing, FIGS. 3A-C depict an autonomous vehicle 10 and FIG. 4 provides a view of the autonomous vehicle 10 of FIGS. 3A-C with a portion of the housing 12 removed to reveal the interior. In embodiments, the autonomous vehicle 10 includes the housing 12 may be a body comprising a floor 42, a first end 44 and a second end 46 opposite the first end 44. Specifically, in some embodiments, the housing 12 is a hollow housing, and the body of the housing 12 may form a first opening 45 at the first end 44 and/or a second opening (not visible) at the second end 46. For example, as depicted in FIG. 3A-C, the floor 42 may join with opposing edges of a shell 48 extending thereover to form the housing 12, which may be hollow to form an interior storage area into which modular container 20 may be placed. Additionally or alternatively, the housing 12 may include the floor 42 and a shell 48, where the shell 48 comprises a first side wall 47, a second side wall 49 opposite the first side wall 47, and a top wall 51 joining top edges of the first and second side walls 47,49. The inner surfaces of the housing 12 may be substantially smooth and/or substantially absent of inward-facing protrusions or other such interfering features to ensure ease of loading and unloading the modular containers 20 therein. In some embodiments, the first end 44 and the second end 46 may present a substantially flat surface for closely aligning with or abutting against loading docks and the like, such that a minimum gap is present between such a loading dock and the floor 42 and/or the container-moving mechanisms 22 during loading and unloading of the modular containers 20.

In some embodiments, the housing 12 includes one or more doors for selectively covering the first opening 45 and/or second opening formed by the body of the housing 12. Specifically, the housing 12 may include a first door 50 at the first end 44 and a second door (not visible) at the second end 46. In some embodiments, the first door 50 and second door are each actuatable between an open configuration and a closed configuration via the door actuators 32 and the control system 30. For example, FIG. 3A depicts the first door 50 in a closed configuration, and FIGS. 3B-C depict the first door 50 in an open configuration, wherein the first door 50 has been actuated to swing up and outward away from the housing 12 to reveal the first opening 45. Access to the plurality of modular containers 20 within the housing 12 may thereby be provided when at least one of the first door 50 and second door are actuated to the open configuration.

The door actuators 32 may comprise various electrical or electromechanical systems that are electrically and/or communicably coupled to the control systems 30 described herein. For example, various motors or actuation systems may actuate the doors to roll up, lift up, slide up away from the floor 42, or to slide two portions of the doors away from each other. In another embodiment, various motors or actuation systems may actuate or allow actuation of one or more portions of the doors to pivot away from each other, for example, to provide complete or partial access to the interior of the housing 12. In one embodiment, the doors may include two portions, e.g., a pair of doors located at each respective end of the autonomous vehicle 10, each portion/each door in each pair of pairs may be independently actuated. These and other methods of actuating the doors from the closed configuration to the open configuration may be used without departing from the scope of the technology described herein. Alternatively, one or more of the doors may be omitted without departing from the scope of the technology described herein. For example, the openings of the housing 12 may remain continually open during travel of the autonomous vehicle or the doors may be replaced with other retaining devices for preventing the modular containers 20 from sliding out of the housing 12 during transport.

Each of the wheels 14 may be rotatably and/or steerably coupled to the housing 12 and may include any wheels known in the art, including traditional vehicle wheel and tire configurations. In some embodiments, the wheels 14 may include and/or be operable coupled to wheel actuators 34 (shown in FIG. 2). For example, the wheel actuators 34 may include propulsion actuators or propulsion units such as motors for clockwise and counter-clockwise rotation of the wheels 14. The wheel actuators 34 may also include steering actuators operable to pivot or rotate an angle of one or more of the wheels 14 left or right about a center axis extending through a diameter of the wheel 14. For example, in some embodiments the wheels 14 may be independently steerable motorized wheels 14 rotatably attached to the housing 12 or a chassis supporting the hollowed housing 12 and/or the lifter 16. Such independently steerable motorized wheels 14 may each comprise independent steering actuator motors that may independently steer each of the wheels. In some example embodiments, there are four wheels and the autonomous vehicle 10 features four-wheel drive all electric wheels suitable for bi-directional travel, so that no turning around (e.g., a "three point turn") is required to change directions of travel of the autonomous vehicle 10. For example, upon approaching and then unloading of the modular containers 20 at a loading dock by providing access to the interior of the housing 12 via the first opening 45 at the first end 44, the autonomous vehicle 10 may instruct the wheels 14 to then begin turning in the opposite direction of travel away from the loading dock and continuing in that direction for the duration of travel to a next destination, without requiring any turning around to reorient the first end 44 to "face" the direction of travel. As such, the wheels 14 may be turned or rotated in a clockwise direction to approach a loading dock with the first end 44, and turned or rotated in a counterclockwise direction to egress from the loading dock, with the second end 46 leading.

Figure 7A:
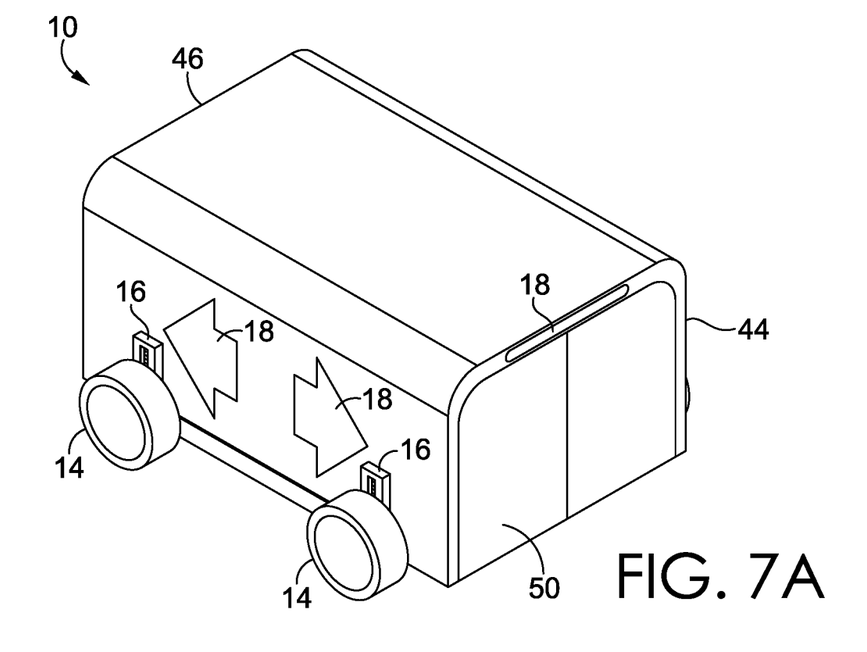
FIG. 7A depicts a perspective view of the autonomous vehicle of FIG. 3A in a first vertical orientation in accordance with an embodiment hereof.
Figure 7B:
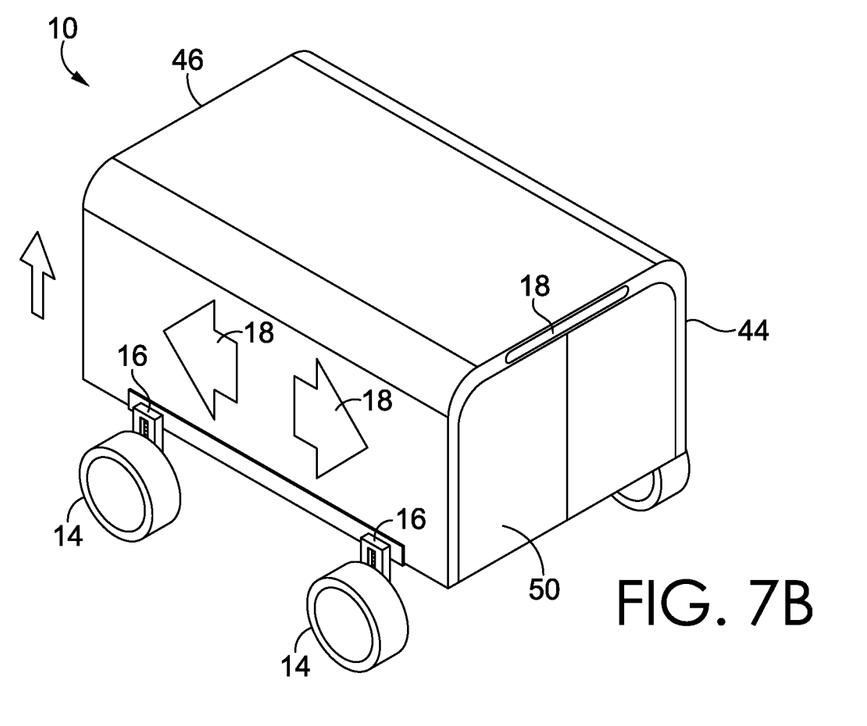
FIG. 7B depicts a perspective view of the autonomous vehicle of FIG. 7A raised to a second vertical orientation in accordance with an embodiment hereof.

The lifter 16 may be one or more actuators attached to the housing 12 and actuatable to modify an elevation of the floor 42, other components of the housing 12, and/or other components of the autonomous vehicle 10. For example, as depicted in FIGS. 7A and 7B, the lifter 16 may comprise a plurality of lifting actuators operable to receive signals from the control system 30 to modify the elevation, such as raising or lowering the housing 12 or the floor 42 thereof. Alternatively, the lifter 16 may comprise one or more lifters on a chassis or platform to which the wheels 14 are attached, with the one or more lifters 16 modifying the elevation of the housing 12 and/or the floor 42 thereof relative to the chassis or platform. The lifters 16 described herein may comprise various mechanical, electromechanical, hydraulic, or other actuation systems known in the art and activated by signals/instructions received from the control system 30. The lifters 16 may allow matching elevation levels of the floor 42 of the autonomous vehicle 10 with loading docks and other destination locations of varying heights.

Figure 8A:
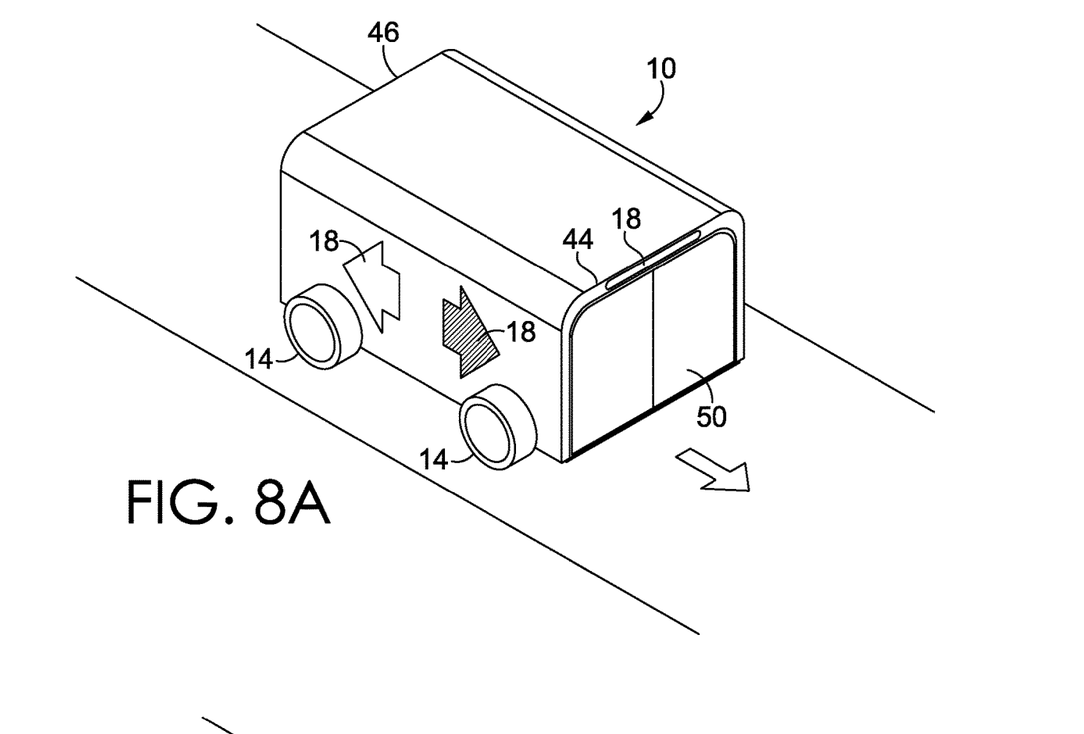
FIG. 8A depicts a perspective view of the autonomous vehicle of FIG. 3A traveling in a first direction in accordance with an embodiment hereof.
Figure 8B:
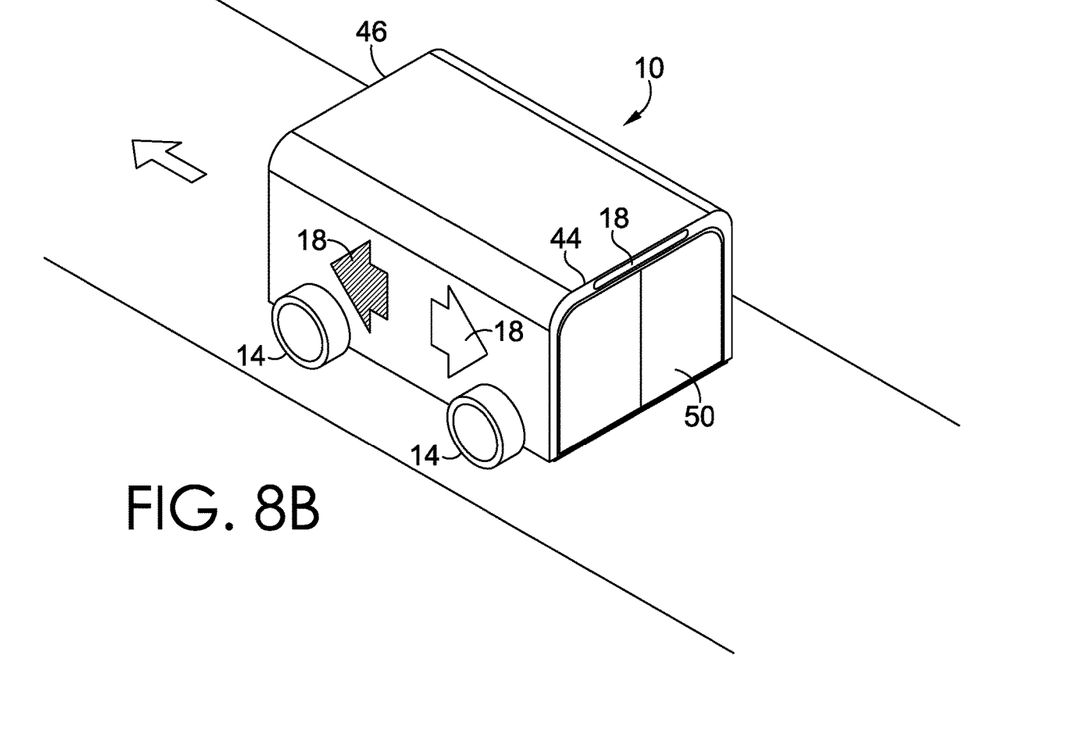
FIG. 8B depicts a perspective view of the autonomous vehicle of FIG. 8A traveling in a second direction opposite the first direction in accordance with an embodiment hereof.

The at least one indicator light 18 may be located on an exterior of the housing 12 and may be configured for indicating a travel direction of the autonomous vehicle 10. In some embodiments, as depicted in FIGS. 8A and 8B, the at least one indicator light 18 may include two indicator lights, with a first one of the indicator lights 18 lighting up to indicate that the autonomous vehicle 10 is traveling in a first direction and a second one of the indicator lights 18 lighting up to indicate that the autonomous vehicle 10 is traveling in a second direction opposite the first direction. For example, each of the indicator lights 18 may be shaped with a triangle or an arrow pointing in the direction of travel corresponding to that one of the indicator lights, or alternatively may use text or other features to indicate the autonomous vehicle's direction of travel. In some embodiments, the indicator lights 18 may additionally or alternatively include front and rear indicator lights located at each of the first end 44 and the second end 46 of the housing 12. This feature allows other drivers or pedestrians to know which direction the autonomous vehicle 10 is traveling to avoid collisions.

The indicator lights 18 may be activated by the control system 30 and/or by any one or more of the sensors described herein or otherwise incorporated into the autonomous vehicle 10 and capable of detecting the travel direction of the autonomous vehicle 10. In some embodiments of the invention, the indicator lights 18 may be replaced with other mechanisms or devices for indicating a direction of travel as described herein, such as flipping of a sign, rotating of an arrow indicator, or numerous other methods known in the art for visually and/or audibly communicating direction information with human drivers or pedestrians in the industrial yard. Additionally or alternatively, some embodiments of the indicator lights 18 may further include lights or other such indicators of how many modular containers 20 are present within the autonomous vehicle 10.

Figure 5:
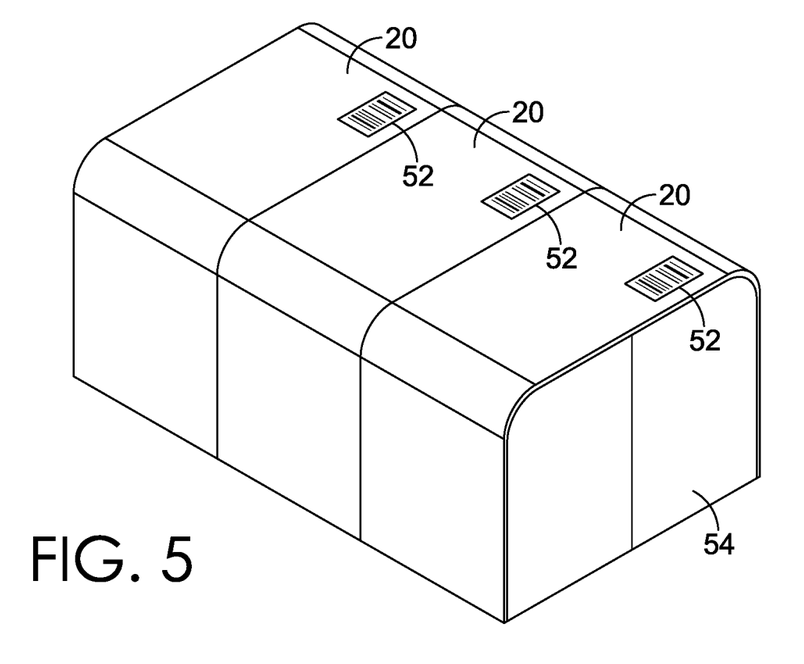
FIG. 5 depicts a plurality of the modular containers for transport within the hollow housing of the autonomous vehicle of FIG. 3A in accordance with an embodiment hereof.

The modular containers 20 may comprise a plurality of modular containers sized to fit within the housing 12, as shown in FIGS. 3B and 5, for example. In some embodiments, two, three, or four modular containers 20 can fit within the housing 20 of each of the autonomous vehicles 10. However, any number of the modular containers 20 may fit within the housing 12 without departing from the scope of the technology described herein. In some embodiments, the modular containers 20 may each be shaped like a cube, a right rectangular prism, or a rectangular cuboid, for example, and may be at least partially hollow for allowing a variety of packages or items to be transported therein. In some embodiments, the modular containers 20 may include a floor, two side walls, and a top wall, similar to the housing 12 described herein, and may likewise have a first end and a second end. Furthermore, as depicted in FIG. 5, a plurality of the modular containers 20 may comprise or have attached thereto one or more modular container identifiers 52 for reading by the scanner 28 as later described herein. The modular container identifiers 52 may include bar codes, QR codes, RFID tags, or other identifiers known in the art affixed to, printed on, or otherwise connected to each of the modular containers 20, as depicted in FIGS. 3C and 5. Advantageously, pre-loading one or more items of varying sizes within the modular containers 20 may allow more efficient loading and unloading into the autonomous vehicles 12 in an autonomous manner as compared to merely loading and unloading of the items themselves into an autonomous vehicle, which would require a more complicated loading and unloading system that adapts to a plurality of sizes and shapes.

Figure 6A:
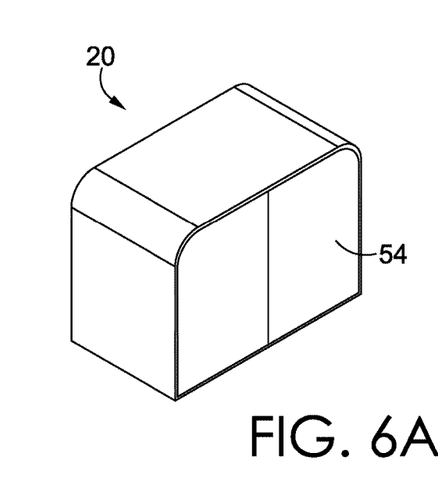
FIG. 6A depicts a perspective view of the modular container of the autonomous vehicle of FIG. 3A in a closed configuration in accordance with an embodiment hereof.
Figure 6B:
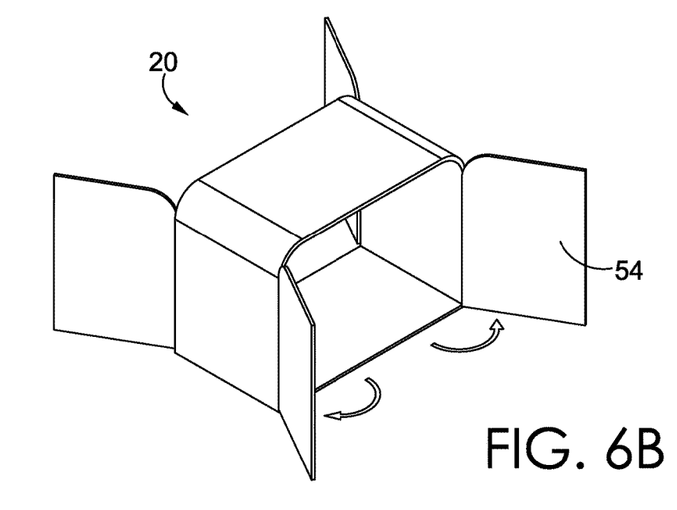
FIG. 6B depicts a perspective view of the modular container of FIG. 6A in an open configuration in accordance with an embodiment hereof.

Furthermore, the modular containers 20 may each form openings at the first end and/or the second end thereof, and the openings may be covered by one or more container doors 54. FIGS. 6A-D provide examples of modular containers 20 having one or more container doors 54. Specifically, the modular containers 20 may include the container doors 54 and the container door actuators 36 (as shown in FIG. 2). The container doors 54 may selectively cover the first and/or second openings of each of the modular containers 20. Specifically, the container doors 54 may include a first container door at the first end of the modular container 20 and a second container door at the second end of the modular container 20. In some embodiments, the first container door and the second container door are each actuatable between an open configuration and a closed configuration via the container door actuators 36 and the control system 30. Access to items within the modular containers 20 may thereby be provided when one or more of the container doors 54 are actuated to the open configuration. For example, FIG. 6A depicts a modular container 20 having first and second container doors arranged in a closed configuration, and FIG. 6B depicts the first and second container doors arranged and actuated to abduct and swing outward, away from the container body to an open configuration.

Figure 6C:
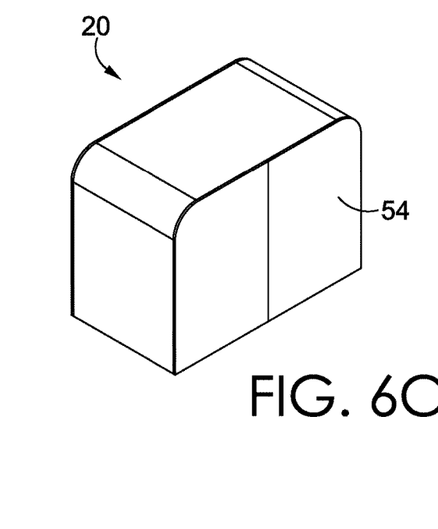
FIG. 6C depicts a perspective view of an alternative modular container for the autonomous vehicle of FIG. 3A in a closed configuration in accordance with an embodiment hereof.
Figure 6D:
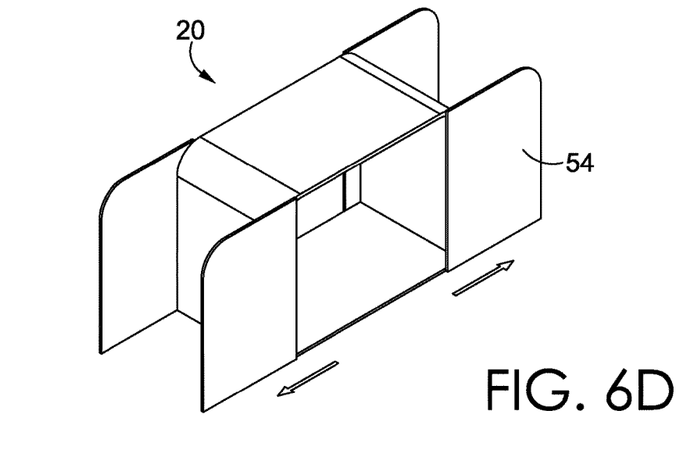
FIG. 6D depicts a perspective view of the modular container of FIG. 6C in an open configuration in accordance with an embodiment hereof.

The container door actuators 36 may comprise various electrical or electromechanical systems that are wirelessly communicably coupled to the control systems 30 described herein. For example, various motors or actuation systems may actuate the container doors 54 to roll up or to slide two portions of the container doors 54 away from each other, as depicted in FIGS. 6C and 6D, respectively. In another embodiment, various motors or actuation systems may actuate or allow actuation of two portions of the container doors 54 to pivot away from each other, as depicted in FIGS. 6A and 6B. These and other methods of actuating the container doors 54 from the closed configuration to the open configuration may be used without departing from the scope of the technology described herein. Alternatively, one or more of the container doors 54 may be omitted without departing from the scope of the technology described herein. In some embodiments, the container doors 54 may be remote controlled by a user or manually opened by a user upon receipt of the modular container 20 at a loading dock or another destination location. Generally, the container doors 54 of the modular containers 20 may rest in a closed configuration during loading, unloading, and/or transport within the housing 12 of the autonomous vehicle 10.

Accordingly, in some embodiments, the plurality of modular containers 20 may be loaded and unloaded from the autonomous vehicle 10 by using or leveraging container-moving mechanisms 22. The container-moving mechanisms 22 may be included in some configurations of the autonomous vehicles 10, such as on or integrated into the floor 42 of the housing 12. In some embodiments, the container-moving mechanisms 22 may comprise a flat belt conveyor, a roller deck, or a retractable roller deck, as depicted in FIG. 4, for ease of inserting and removing the modular containers 20 into and out of the autonomous vehicle 10. For example, the retractable roller deck may include a plurality of roller bearings and a roller deck floor and may be operable to retract the roller bearings below the roller deck floor during travel of the autonomous vehicle 10 and to extend the roller bearing at least partially above the roller deck floor to a non-retracted orientation during loading/unloading of the modular containers 20. Retraction may be manually controlled by a user and/or automatically controlled by the control system 30, alone, or in tandem with sensors described herein. Additionally or alternatively, various locking mechanisms of the floor 42 or housing 12 may be deployed for holding the modular containers 20 in place during travel of the autonomous vehicles 10.

The one or more sensors 24, 26 of the autonomous vehicle 10 may include one or more proximity sensors 24 and/or one or more location sensors 26, as shown in FIG. 2. The proximity sensors 24 may be configured for identifying proximity of the housing 12 to other objects, such as various other autonomous vehicles 10, a loading dock, a building, or any other objects in the autonomous vehicle's path or navigation route. The proximity sensors 24 may include, for example, a camera, a LIDAR sensor, an ultrasonic sensor, a SONAR sensor, capacitive sensors, inductive sensors, Hall-effect sensors, and/or the like. The proximity sensors 24 may be configured to detect a proximity or distance between the first end 44 of the housing 12 and an object and/or the second end 46 of the housing 12 and an object. This may be accomplished, for example, with a forward facing proximity sensor and a rear facing proximity sensor. Alternatively, a single proximity sensor may be configured to rotate to a forward-facing or rear-facing direction based on the direction of travel of the autonomous vehicle 30. One or more proximity sensors 24 may also be used to determine an elevation to which the lifter should actuate the floor 42 of the housing 12 for loading and/or unloading of the modular containers 20. In various embodiments, the one or more proximity sensors 24 may be placed at any location of or surface on the exterior (e.g., a sensor utilizing line of sight) or interior (i.e., a sensor utilizing signal strength of another device to determine proximity) of the autonomous vehicle 10.

The location sensors 26 may be configured to provide geographic location data of the autonomous vehicle 10 to the control system 30, which may use this data to provide navigation instructions to the wheels 14 or the wheel actuators 34 thereof. The geographic location data may serve as a proxy for the modular container(s) 12 stowed in the housing 12, in some embodiments, for tracking and/or reporting purposes. Specifically, the location sensors 26 may include outdoor positioning aspects such as a location module adapted to acquire, for example, latitude, longitude, altitude, geocode, course, direction, heading, speed, universal time (UTC), date, and/or various other information/data. In one embodiment, the location sensors 26 can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Global Navigation Satellite System (GLONASS), Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, location information/data can be determined by triangulating of the location sensor's 26 position in connection with a variety of other systems, including cellular towers, Wi-Fi access points, and/or the like.

Similarly, the location sensors 26 may include indoor positioning aspects, such as a location module adapted to acquire, for example, latitude, longitude, altitude, geocode, course, direction, heading, speed, time, date, and/or various other information/data, and provide the indoor positioning information to indoor systems. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings, including outdoors within industrial yards or the like, to determine the location of someone or something to within inches or centimeters.

The scanner 28 may include a barcode scanner, a camera, a computer vision system, a radio frequency identification (RFID) antenna and/or the like that is configured to read the modular container identifier 52 of the modular container 20. The scanner 28 may be communicatively coupled to the control system 30, and the scanner 28 may communicate information/data associated with the modular container identifier 52 of each modular container 20 to the control system 30 described herein. In some embodiments, the scanner 28 may be configured for reading and sending to the control system 30 identification data from each of the modular containers 20 loaded into the autonomous vehicles 10 and order data indicating order, sequence, or location of each of the modular containers 20 within the housing 12 relative to each other or relative to the first or second ends 44, 46 of the housing 12. In some embodiments, the scanner 28 may comprise a plurality of scanners in a plurality of locations of the autonomous vehicle 10, such as a first scanner proximate the first end 44 and a second scanner proximate the second end 46. Alternatively, the scanner 28 may be omitted and identification data may be provided to the control system 30 via manual user entry or the like.

Additionally, in some embodiments, additional scanners may be located in one or more of the modular containers 20. These additional scanners may comprise a barcode scanner, a camera, a computer vision system, a radio frequency identification (RFID) antenna and/or the like configured to read identification data on one or more items inserted into the modular containers 20. For example, bar codes, QR codes, RFID tags, or other identifiers known in the art may be affixed to, printed on, or otherwise connected to each of the items or packages loaded into each of the modular containers 20. Therefore, some embodiments may be configured to scan such item identification data as items are loaded into or unloaded out of the modular containers 20.

The control system 30 is configured to direct operation of the different elements of the system 38, as depicted in FIG. 2. The control system 30 may be configured to control each of the elements individually, and in addition, in coordination. In other words, the control system 30 may be adapted to allow different elements of the system 38 to work together (e.g., the wheel actuators 34 and the location sensor 26) to facilitate automated or semi-automated operation and transport of the autonomous vehicle 10 and the modular containers 20 therein. The control system 30 may be one that is locate to the elements and/or global or remote. The control system 30 may include one or more computer components, computer memories, and/or communication components in different embodiments, such as any components of the computing device 1, as depicted in FIG. 1 and described above.

In some embodiments, the control system 30 may be located anywhere within the autonomous vehicle 10 that does not interfere with loading and unloading of the modular containers 20 or with travel thereof. For example, the control system and/or any of the sensors, scanners, or actuators described herein may be located at any location and/or at any surface of the body of the autonomous vehicle, e.g., may be integrated with or located on an interior or exterior surface of the body, such as the housing 12, the floor 42, the top wall, the side walls. Some computing capabilities or memory storage of the control system 30 may be remotely located from the autonomous vehicle 10 without departing from the scope of the technology described herein.

The control system 30 is configured to instruct rotatable actuation and steering of at least one of the wheels 14 or the wheel actuators 34 thereof. Furthermore, the control system 30 may output such instructions for wheel actuation and steering based on one or more of user input, input from the proximity sensor 24, input from the location sensor 26, and input read from a memory storage device, such as the memory 2 depicted in FIG. 1. For example, the control system 30 may be configured to provide navigation data or navigation instructions to the wheels 14 or wheel actuators 34 based on the geographic location data from the location sensors 26.

The control system 30 may also be configured to receive from the scanner 28 identification data from the modular containers 20 loaded into the autonomous vehicles 10 and order data indicating order or location of each of the modular containers 20 within the housing 12 relative to each other or relative to the first or second ends 44, 46 of the housing 12. The control system 30 may also be configured to output commands associated with direction of travel data to the indicator lights 18 instructing which of the indicator lights 18 to actuate. Furthermore, in some embodiments, the control system 30 may provide signals to the door actuators 32 and/or the container door actuators 36 to cause the doors 50 of the housing 12 or the container doors 54 of the modular containers 20 to transition between the open configuration and the closed configuration. The control system 30 may additionally or alternatively be configured to command actuation of the container moving mechanisms 22, such as, for example, starting or stopping actuation of a flat belt conveyor or retracting ball bearings thereof to prevent undesired movement of the modular containers 20 thereon during transport.

Figure 9:
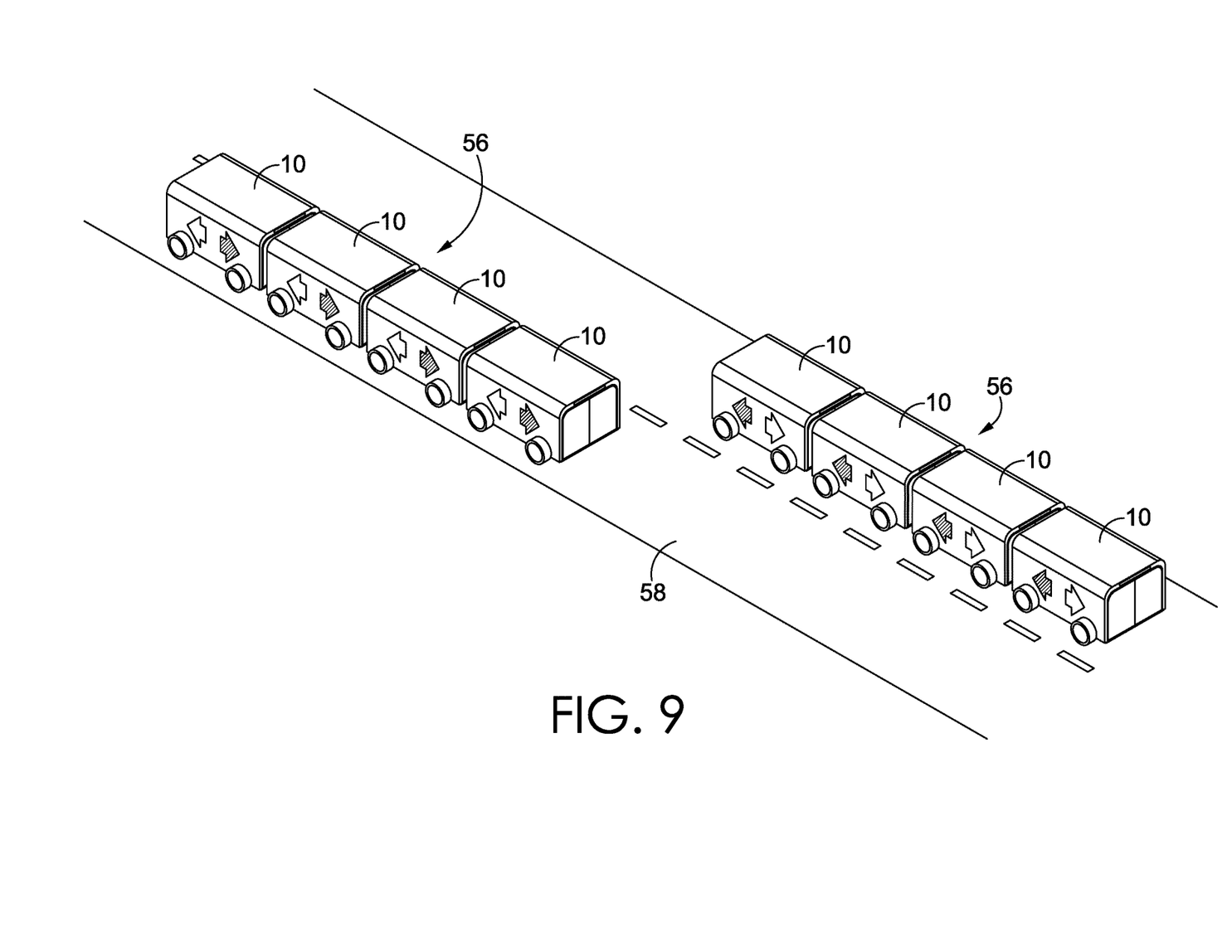
FIG. 9 depicts a plurality of the autonomous vehicles, such as the autonomous vehicle of FIG. 3A, moving together in a coordinated manner in accordance with an embodiment hereof.

In some embodiments, the plurality of the autonomous vehicles 10 may coordinate with each other for coordinated travel, as depicted in FIG. 9. Specifically, the control system 30 of a first one of the autonomous vehicles may be wirelessly communicably coupled to the control system of a second one of the autonomous vehicles remote from the first one of the autonomous vehicles for coordinated travel or cooperative travel. This can assist in efforts to avoid collisions of the autonomous vehicles 10 and furthermore allow efficient travel of multiple autonomous vehicles 10 in a given industrial yard or complex. For example, during over-the-road travel, multiple ones of the autonomous vehicles 10 can be ganged together (e.g., platooning) in a virtual train 56 and travel down a road 58 as a group within inches of each other. In this configuration, through the use of wireless communication, when a lead one of the autonomous vehicles 10 stops or slows down, the others in the train also stop or slow down accordingly in a synchronous fashion. Furthermore, the control systems 30 of the plurality of autonomous vehicles 10 may share data with each other regarding the contents therein (e.g., the identification data and/or the order data described herein) and based on this data may coordinate autonomous transfer of any one of the plurality of modular containers 20 from the first one of the autonomous vehicles to the second one of the autonomous vehicles.

Figure 10:
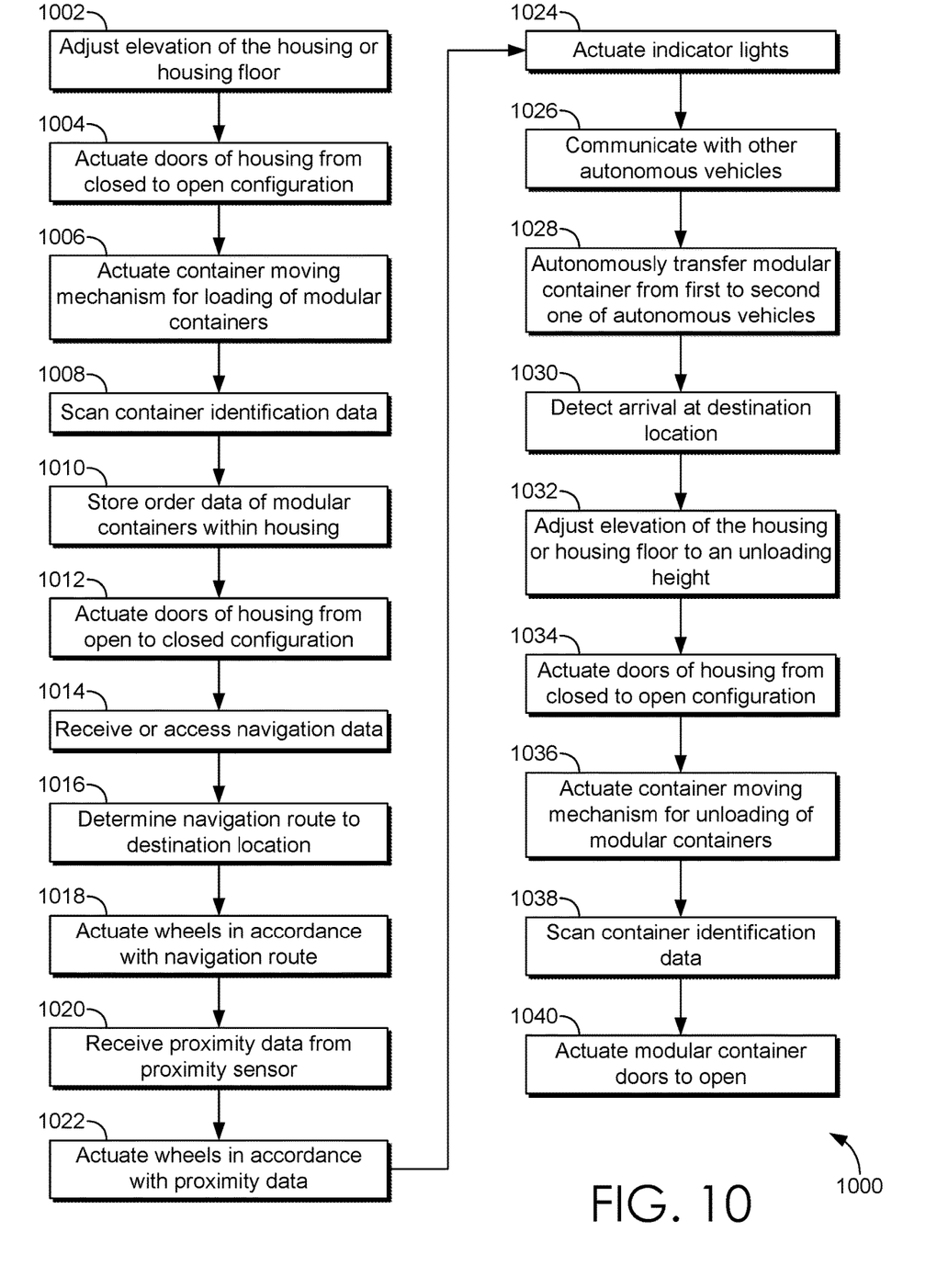
FIG. 10 depicts a flow chart of a method of operating one or more of the autonomous vehicles of FIGS. 1-9 in accordance with embodiments hereof.

As depicted in FIG. 10, the autonomous vehicles 10 described above may be used in a method 1000 for transporting and loading/unloading the modular containers 20 in an automated fashion. At least a portion of the steps of the method 1000 in accordance with various embodiments of the present invention are listed in FIG. 10. The steps may be performed in the order as shown in FIG. 10, or they may be performed in a different order. Further, some steps may be performed concurrently as opposed to sequentially. In addition, some steps may be omitted. Still further, embodiments of the present invention may be performed using systems other than the systems and apparatuses described herein without departing from the scope of the technology described herein.

In some embodiments, the method 1000 for using the autonomous vehicles 10 to transport the modular packages 20 in an automated fashion can include adjusting an elevation of the housing 12 or the floor 42 thereof, as depicted in block 1002 to a loading height for receiving one or more of the modular containers 20. In an alternative embodiment, the elevation is determined to presently be at a defined loading height and adjustment is not performed. Next, the method 1000 may include actuating one or more of the doors of the housing 12 from the closed configuration to the open configuration, as depicted in block 1004, and actuating the container moving mechanism 22 for loading of one or more of the modular containers 20 into a desired location within the housing 12, as depicted in block 1006. For example, the container moving mechanism 22 may be instructed to actuate a flat belt conveyor in a forward or aftward direction or to alternatively actuate a retractable roller deck into its non-retracted configuration for receiving the modular containers 20 to freely roll thereon into the desired location. The flat belt conveyor's actuation would then be stopped or the retractable roller deck may then retract so that the modular containers 20 stay put during transport.

The method 1000 may further include scanning container identification data for each of the modular containers 20, as depicted in block 1008, as they are loaded into the autonomous vehicle 10. For example, the scanner 28 may scan the modular data identifiers 52 of each of the modular containers 20. Additionally, in some embodiments, the method 1000 may include storing order data for each of the modular containers 20 loaded into the autonomous vehicle 10, as depicted in block 1010. For example, if there are three modular containers 20 stored on an autonomous vehicle 10, the identification data for each of the modular containers 20 may be associated in a memory of the control system 30 with order data (e.g., a sequence of modular containers 20), such as positions one, two, or three relative to the first end 44 of the housing 12. Once the modular containers 20 are loaded, the method 1000 may further include actuating the doors 50 of the housing 12 from the open configuration to the closed configuration, as depicted in block 1012.

Next, the method 1000 can include receiving or accessing navigation data, as depicted in block 1014. Navigation data may include a current location of the autonomous vehicle 10 based on data from the location sensor 26, a destination location for one or more of the modular containers 20, and/or maps and routes accessed or otherwise determined by the control system 30. In some embodiments, the destination location may be programmed locally or remotely into the control system 30 based on identification data received via the scanner 28 and associated with each of the modular containers 20. Furthermore, in some embodiments, the destination location may be determined based on remote sensors or beacons located at various destination locations within an industrial yard or other such facility.

Next, the method 1000 may include determining a navigation route to the destination location, as depicted in block 1016. For example, the navigation route may be calculated by the control system 30 based on the navigation data received. However, where navigation routes are routine, such navigation routes may be stored in memory accessible by the control system 30 without departing from the scope of the technology described herein. Then the method 1000 may include actuating the wheels 14 in accordance with the navigation route, as depicted in block 1018.

Additionally, the method 1000 may further include receiving proximity data from the proximity sensors 24, as depicted in block 1020, and further actuating the wheels 14 in accordance to the proximity data, as depicted in block 1022. For example, if the proximity sensor 24 detects an object blocking its navigation route, the control system 30 may command the wheels 14 or the wheel actuators 34 thereof to steer around the object or stop until the object is no longer in the navigation route. This may assist in avoiding collisions.

The method 1000 may further include a step of actuating one or more of the indicator lights 18 to indicate a direction of travel of the autonomous vehicle 10, as depicted in block 1024. For example, the control system 30 may instruct a first light or first set of lights of the indicator lights 18 to light up when the autonomous vehicle 10 is traveling in a first direction and may instruct a second light or second set of lights of the indicator lights 18 to light up when the autonomous vehicle 10 is traveling in a second direction opposite the first direction.

In some embodiments, the method 1000 may further include communicating data with other autonomous vehicles, as depicted in block 1026, for cooperative or coordinated travel, avoiding collisions, and/or transferring of ones of the modular containers 20 between autonomous vehicles. The communicated data may include location data, proximity data, destination locations, identification data, and/or order data. This can assist in efforts to avoid collisions of the autonomous vehicles 10 and furthermore allow efficient travel of multiple autonomous vehicles in a given industrial yard or complex. As described above, this may include ganging a plurality of the autonomous vehicles together in the virtual train 56 and traveling down the road 58 as a group with each other, as depicted in FIG. 9. Furthermore, some embodiments of the method 1000 may further include autonomously transferring any one of the plurality of modular containers 20 from a first one of the autonomous vehicles to a second one of the autonomous vehicles, as depicted in block 1028, based on identification data and order data shared between control systems 30 of the autonomous vehicles 10.

The method 1000 may further include detecting arrival at the destination location, as depicted in block 1030, and actuating the lifter 16 to modify the elevation of the housing 12 or the floor 42 thereof to a desired unloading height, as depicted in block 1032. The unloading height, for example, may correspond with a stored height of a loading dock or may be determined by one or more of the sensors described herein. In other alternative embodiments, the destination location may be another one of the autonomous vehicles 10 or another vehicle such as a transport truck, an aircraft, an aerial autonomous vehicle, or the like without departing from the scope of the technology described herein.

Next, the method 1000 may include a step of actuating the doors 50 to open, as depicted in block 1034, actuating the container moving mechanism 22 to allow unloading of at least one of the modular containers 20, as depicted in block 1036, and/or scanning identification data for each of the modular containers 20, as depicted in block 1038, as they are unloaded off of the autonomous vehicle 10. However, one or more of these steps may be omitted or manually performed without departing from the scope of the technology described herein. In some embodiments, the modular containers 20 are unloaded directly to conveyors or ball decks at the destination location for further transport within a facility or the like.

In some embodiments of the invention, the method 1000 may further include actuating the container doors 54 to open, as depicted in block 1040. Specifically, the container doors 54 may be configured to automatically open upon release of the modular container 20 from the hollow housing 12 and/or upon the container door actuators 36 receiving commands to open from the control system 30, as described above. However, manual user actuation of the container doors 54 may be used upon delivery or a separate system may open the container doors 54 without departing from the scope of the technology described herein.

In some alternative embodiments, the modular containers 20 may remain within the housing 12 while items therein are unloaded. For example, the containers doors 54 of a first one of the modular containers 20 may be opened to unload items therein, then the container doors 54 of a second one of the modular containers 20 may be opened to unload items therein, with items from the second one of the modular containers 20 being pulled or fed through both ends of the opened first one of the modular containers 20. This process may continue for any number of modular containers 20 within the housing 12. Thus, as desired, in some embodiments, the modular containers 20 may be unloaded without being removed from the housing 12.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. An autonomous vehicle for autonomous item transport, the autonomous vehicle comprising:

a housing having a body, a first end, and a second end opposite the first end, the first end comprising a first door, and the second end comprising a second door;

a plurality of motorized wheels rotatably attached to the housing;

a plurality of modular containers sized to fit within the housing;

a proximity sensor configured for identifying proximity of the housing to an object;

a scanner configured for reading identification data from each of the plurality of modular containers as each of the plurality of modular containers is loaded into the housing; and a computing device communicably coupled to the proximity sensor and the scanner, wherein the scanner sends to the computing device the identification data from each of the plurality of modular containers loaded into the housing and order data indicating at least one of an order or a location of each of the plurality of modular containers within the housing relative to at least one other modular container of the plurality of modular containers or relative to the first end or the second end of the housing.

2. The autonomous vehicle of claim 1, further comprising a retractable roller deck and one or more lifter actuators attached to the housing and actuatable to modify an elevation of the retractable roller deck.

3. The autonomous vehicle of claim 1, further comprising a location sensor, wherein the computing device is further configured to provide navigation instructions to the plurality of motorized wheels based on geographic location data from the location sensor.

4. The autonomous vehicle of claim 1, further comprising at least one indicator light on an exterior of the housing that is configured for indicating a travel direction of the autonomous vehicle.

5. The autonomous vehicle of claim 1, wherein at least one of the first door or the second door is actuatable between an open configuration and a closed configuration via the computing device, wherein access to the plurality of modular containers within the housing is provided when at least one of the first door or the second door is actuated to the open configuration.

6. The autonomous vehicle of claim 1, wherein each of the plurality of modular containers is a hollow container with a first container end, a second container end opposite the first container end, a first container door at the first container end, and a second container door at the second container end.

7. The autonomous vehicle of claim 1, wherein the object comprises a second autonomous vehicle comprising a second computing device, and the computing device is communicatively coupled to the second computing device to provide the identification data of the at least one of the plurality of modular containers and to cooperatively facilitate transfer of the at least one of the plurality of modular containers to the second autonomous vehicle.

8. An autonomous vehicle comprising:

a hollow housing having a body, a first end, and a second end opposite the first end;

the first end comprising a first door, the second end comprising a second door;

a plurality of independently steerable motorized wheels rotatably attached to the hollow housing;

a plurality of modular containers sized to fit within the hollow housing;

a location sensor configured for identifying a current location of the autonomous vehicle;

a scanner configured for reading identification data from each of the plurality of modular containers as each of the plurality of modular containers is loaded into the hollow housing; and a computing device communicably coupled to the location sensor and the scanner, wherein the scanner sends to the computing device the identification data from each of the plurality of modular containers loaded into the hollow housing and order data indicating at least one of an order or a location of each of the plurality of modular containers within the hollow housing relative to at least one other modular container of the plurality of modular containers or relative to the first end or the second end of the hollow housing.

9. The autonomous vehicle of claim 8, wherein the computing device is further configured to receive geographic location data from the location sensor and provide navigation instructions to the plurality of independently steerable motorized wheels based on the geographic location data from the location sensor.

10. The autonomous vehicle of claim 8, wherein the computing device is communicably coupled to communicate with another computing device of another autonomous vehicle the identification data for at least one module container of the plurality of modular containers and the order data and to cooperatively transfer the at least one modular container of the plurality of modular containers to the another autonomous vehicle.

11. The autonomous vehicle of claim 8, wherein at least one of the first door or the second door is actuatable between an open configuration and a closed configuration via the computing device, wherein access to at least one modular container of the plurality of modular containers within the hollow housing is provided when at least one of the first door or the second door is actuated to the open configuration.

12. The autonomous vehicle of claim 8, wherein each of the plurality of modular containers is a hollow container with a first container end, a second container end opposite the first container end, a first container door at the first container end, and a second container door at the second container end, wherein the first container door and the second container door are automated to an open configuration, providing interior access upon release of the modular container from the hollow housing and receiving commands to open from the computing device.

* * * * *